United States Patent Office 3,355,442
Patented Nov. 28, 1967

3,355,442
PROCESS FOR SEPARATION OF CHLORINATED POLYMERS FROM CARBON TETRACHLORIDE BY AZEOTROPIC DISTILLATION
John Heyward Taylor, Widnes, England, assignor to Imperial Chemical Industries Limited, London, SW. 1, England, a corporation of Great Britain
No Drawing. Filed Aug. 26, 1963, Ser. No. 304,638
Claims priority, application Great Britain, Sept. 17, 1962, 35,282/62
5 Claims. (Cl. 260—92.8)

The present invention relates to the production of chlorinated polymers. More particularly it relates to the isolation of chlorinated polymers from mixtures of the polymers with organic solvents.

It is known to improve the properties of certain resinous polymers, notably polyvinyl chloride, polyethylene, polypropylene, natural rubber and polyisoprene, by submitting them in the form of solutions or suspensions in organic solvents to chlorination, whereby a considerable amount of chlorine is introduced into an originally chlorine-free polymer or the chlorine content is increased beyond that of the parent polymer as in the case of polyvinyl chloride. One very suitable organic solvent medium for the chlorination reaction is carbon tetrachloride, since it is itself resistant to chlorination. Another medium which is sometimes preferred because of its better solvent property or its lower boiling point is chloroform, and when this is used some chlorination of the solvent as well as the polymer does take place so that at the end of the chlorination reaction the chlorinated polymer is obtained as a solution or suspension in a mixture of chloroform and carbon tetrachloride. The chlorinated polymer may then be isolated by simple evaporation or steam distillation of the solvent or, when the polymer is insoluble, by simple filtration, followed by drying.

The chlorinated polymer isolated in this way is found, however, to contain some residual solvent, usually 4–7% by weight, which cannot be removed for example by steam distillation or even by prolonged vacuum drying at temperatures as high as 100° C. and pressures as low as 10 mm., and this residual solvent tends to vaporise with very deleterious effects on the shaped products when the chlorinated polymer is extruded or injection-moulded. To obtain satisfactory shaped articles it is necessary to have a chlorinated polymer substantially free from organic solvents. Furthermore, the presence of carbon tetrachloride in particular is objectionable when polymers are used in the form of solutions in other solvents, since breakdown of the somewhat unstable carbon tetrachloride to corrosive products can cause corrosion of storage containers and solvent recovery apparatus.

We have now found that a chlorinated polymer substantially free from organic solvents can be obtained from a mixture of the polymer with chlorinated methanes, particularly carbon tetrachloride, by adding a low boiling aliphatic alcohol to the mixture, distilling off the chlorinated methanes as an azeotrope with the alcohol, and removing any residual alcohol from the solid product by a known technique such as distillation or a combination of filtration and evaporative drying, or by washing with water.

According to the present invention, therefore, a process for the isolation of a chlorinated polymer as hereinafter defined substantially free from organic solvents from a mixture in which the chlorinated polymer is associated with carbon tetrachloride comprises adding to the said mixture an aliphatic alcohol as hereinafter defined in the form of liquid and/or vapour, removing by fractional distillation the carbon tetrachloride as an azeotrope with the alcohol and subsequently removing any residual alcohol from the polymer.

The carbon tetrachloride may be substantially the only solvent present in association with the chlorinated polymer or it may be admixed with lower chlorinated methanes, particularly chloroform, as for instance when the chlorinated polymer has been produced by chlorination of a parent polymer in solution or suspension in chloroform. When lower chlorinated methanes are present they are also removed from the polymer along with the carbon tetrachloride within the scope of the invention by fractional distillation as an azeotrope with the added alcohol.

By the term "chlorinated polymer" in this specification we mean after-chlorinated polyvinyl chloride and products obtained by chlorinating polyethylene, polypropylene, natural rubber and polyisoprene. The aliphatic alcohol is defined as methanol, ethanol, a propanol or tertiary butanol.

The process of the invention may be applied directly to a solution or suspension of the chlorinated polymer in carbon tetrachloride or a mixture of chlorinated methanes or to such a solution or suspension from which a major part of the solvent has first been removed by a suitable means such as distillation or filtration, or yet again it may be applied to a chlorinated polymer which has been isolated as a powder from such a solution or suspension by known methods such as steam distillation, spray drying or filtration and drying and thus contains only a small percentage of occluded solvent.

The alcohol may be added to the mixture of chlorinated polymer and chlorinated methane in the form of liquid or vapour, or partly as liquid and partly as vapour. For instance the liquid alcohol may be added to a solution or suspension of the polymer in carbon tetrachloride or a slurry may be prepared by adding the liquid alcohol to solid polymer which is contaminated with carbon tetrachloride, e.g. a filter cake or a dried powder, and the mixture so produced in either case may be heated to remove the azeotrope by distillation. Alternatively azeotropic distillation may be produced by passing the alcohol vapour through a solution or suspension of the polymer in the chlorinated methane or through a mass of polymer powder which is to be treated for removal of residual chlorinated methane. Yet again, liquid alcohol may be added to a solution or suspension of the polymer in the chlorinated methane or to polymer powder contaminated with the chlorinated methane to produce a suspension and the heat required to bring about azeotropic distillation may be supplied by passing alcohol vapour into the resultant suspension.

The minimum amount of alcohol required to remove all the chlorinated methane from the polymer will depend on the composition of the azeotrope. For instance when the alcohol is methanol and the chlorinated methane is solely carbon tetrachloride, the composition of the azeotrope is about 80 parts of carbon tetrachloride to 20 parts of methanol by weight, so that the minimum proportion of methanol which must be added to a mixture of polymer and carbon tetrachloride in order to remove all the carbon tetrachloride by azeotropic distillation is about 1 part per 4 parts of carbon tetrachloride by weight in the mixture. It is, however, advisable to add rather more than this minimum amount of methanol in order to guarantee substantially complete removal of the carbon tetrachloride. If a part of the carbon tetrachloride is replaced by chloroform in this example, the theoretical minimum amount of methanol will be slightly lower since an azeotropic mixture of chloroform and methanol contains a lower proportion of methanol.

We prefer to carry out the process of the invention in such a manner that when all the chlorinated methane has been removed from the polymer by azeotropic distillation sufficient alcohol is still present to maintain the polymer as a suspension containing 20–50% by weight of polymer. This ensures that no troublesome aggregation of the polymer particles occurs during the azeotropic distillation. Thus we prefer to deal for instance with a suspension of chlorinated polyvinyl chloride in carbon tetrachloride as obtained by chlorination of polyvinyl chloride in this medium by first removing from the polymer as much of the carbon tetrachloride as possible by filtration, then dispersing the filter cake in methanol to give a slurry of about 20% solids content, and submitting the slurry to fractional distillation by heating until substantially all the residual carbon tetrachloride has been removed as the azeotrope. The carbon tetrachloride and methanol can be recovered separately from the azeotrope for re-use by known methods. The dispersion of polymer in methanol obtained when the azeotropic distillation is completed may be freed from methanol by further simple distillation or by adding a quantity of water and distilling or alternatively and preferably this dispersion may be filtered to remove the bulk of the methanol and only the residual methanol need then be removed from the filter cake by evaporation, for example by heating in a hot air oven at 60–70° C., or by washing the cake with water, or by steam distillation. If one of the other alcohols as hereinbefore defined is used instead of methanol, the same methods may be employed for removing residual alcohol from the polymer.

The invention is illustrated by the following examples.

*Example 1*

A slurry of 220 g. of chlorinated polyvinyl chloride (K value 65, chlorine content 65% by weight) in 1366 g. of carbon tetrachloride was mixed with 200 ml. of methanol and the mixture was fractionally distilled until 200 ml. of the carbon tetrachloride methanol azeotrope had been removed. A further 200 ml. of methanol was then added and the azeotropic distillation continued. This procedure was repeated until a total of 1000 ml. of methanol had been added, and the distillation was finally terminated when the distillate was free from carbon tetrachloride. The resultant slurry of the polymer in methanol was filtered and the separated polymer was dried in a hot air oven at 60° C. The dry product was found to contain less than 0.2% by weight of carbon tetrachloride and no methanol.

*Example 2*

The procedure of Example 1 was repeated, but at the end of the azeotropic distillation the bulk of the residual methanol was removed from the polymer by filtration and the moist polymer was washed with water and dried at 60–70° C. The product again contained less than 0.2% by weight of carbon tetrachloride and no methanol.

*Example 3*

The procedure of Example 1 was repeated but at the end of the azeotropic distillation 1000 ml. of water was added to the resultant slurry of polymer in methanol and the whole of the methanol was removed by distillation leaving a slurry of the polymer in water. This was filtered and dried at 60° C. The product again contained less than 0.2% by weight of carbon tetrachloride and no methanol.

*Example 4*

A slurry of 850 g. of the same chlorinated polyvinyl chloride as in Example 1 in 5530 g. of carbon tetrachloride was filtered yielding a moist polymer which still contained 1520 g. of carbon tetrachloride. This was mixed with 1870 g. of methanol and was fractionally distilled until the distillate was free from carbon tetrachloride. The resultant slurry of polymer in methanol was then treated as in Example 1 and the dry product was found to contain less than 0.2% by weight of carbon tetrachloride and no methanol.

*Example 5*

A slurry of polyvinyl chloride in carbon tetrachloride as in Example 1 was steam distilled to remove as much of the carbon tetrachloride as possible and was then dried for 12 days in a hot air oven at 60–70° C. It was found that the dried polymer still contained 6% by weight of carbon tetrachloride. 200 g. of this polymer were mixed with 600 ml. of methanol and the mixture was fractionally distilled until the distillate was free from carbon tetrachloride. The product was filtered off and dried at 60° C. It contained less than 0.2% by weight of carbon tetrachloride and no methanol.

*Example 6*

A slurry of chlorinated polyvinyl chloride as in Example 1 was filtered to remove as much of the carbon tetrachloride as possible and then dried for 3 days at 60–70° C. The dried polymer still contained 6% by weight of carbon tetrachloride. After treatment as in Example 5 it yielded a product containing less than 0.2% by weight of carbon tetrachloride.

*Example 7*

A solution of chlorinated rubber in carbon tetrachloride containing 15% by weight of the polymer was steam distilled to remove as much of the solvent as possible. The polymer was then filtered off dried at 60–70° C. and ball milled. The finely divided chlorinated rubber so obtained was found to be still contaminated with about 6% by weight of carbon tetrachloride. After treatment according to the process of the invention as in Example 5 the carbon tetrachloride content had been reduced to less than 0.2% by weight.

*Example 8*

Example 7 was repeated using ethanol instead of methanol. The treated chlorinated rubber again contained less than 0.2% by weight of carbon tetrachloride.

*Example 9*

Example 6 was repeated using n. propanol instead of methanol. The treated chlorinated polyvinyl chloride again contained less than 0.2% by weight of carbon tetrachloride.

*Example 10*

This example demonstrates that it is not necessary to employ an anhydrous quality of alcohol in the azeotropic distillation for the removal of solvent from a polymer according to the invention. It does in fact show that satisfactory results are obtained when using methanol containing up to about 10% by weight of water.

Example 5 was repeated several times except that the methanol employed contained water in the proportions shown for each run in the following table, which also shows the residual carbon tetrachloride content of the treated polymer.

| Water in methanol percent by weight: | Carbon tetrachloride in treated polymer percent by weight |
|---|---|
| 8 | <0.2 |
| 20 | 2.9 |
| 30 | 3.2 |
| 50 | 5.2 |

*Example 11*

800 g. of polyvinyl chloride (K value 60) was suspended in 3000 ml. of 21% w./w. hydrochloric acid, 200 ml. of chloroform was added as swelling agent, and the suspension was chlorinated to 66% by weight chlorine content, in the polymer. The chlorinated polymer was filtered off, washed with water until acid-free and dried for 2 days in a hot air oven at 60–70° C. The dry polymer was found to contain 3.2% by weight residual chloroform and carbon tetrachloride.

200 g. of the dry polymer were mixed with 600 ml. of methanol and submitted to fractional distillation, filtration and drying as in Example 5. The treated polymer contained less than 0.2% by weight of chlorinated hydrocarbon solvent (carbon tetrachloride and chloroform).

*Example 12*

200 g. of a dried chlorinated polyvinylchloride containing 10% by weight of carbon tetrachloride was mixed with 600 ml. of tertiary butanol and submitted to fractional distillation, filtration and drying as in Example 5. The treated polymer contained less than 0.2% by weight of carbon tetrachloride.

*Example 13*

200 g. of a dried chlorinated polyisoprene containing approximately 6% by weight of carbon tetrachloride was mixed with 600 ml. of methanol and submitted to fractional distillation, filtration and drying in the manner described in Example 5. The treated polymer contained less than 0.2% by weight of carbon tetrachloride.

What we claim is:

1. A process for the isolation of a chlorinated polymer selected from the group consisting of chlorinated polyvinyl chloride, chlorinated polyethylene, chlorinated polypropylene, chlorinate natural rubber and chlorinated polyisoprene from a mixture comprising said chlorinated polymer and carbon tetrachloride, which comprises adding to said mixture an amout of an aliphatic alcohol selected from the group consisting of methanol, ethanol, a propanol and tertiary butanol at least sufficient to form an azeotrope with said carbon tetrachloride, removing by fractional distillation the azeotrope of said carbon tetrachloride with said alcohol, and subsequently removing any residual alcohol from the polymer.

2. The process as claimed in claim 1 wherein said alcohol is methanol and said methanol is present in an amount of at least about one part per four parts of carbon tetrachloride by weight in said mixture, whereby isolated chlorinated polymer contains less than 0.2% by weight of carbon tetrachloride and essentially no methanol.

3. A process according to claim 1, wherein the chlorinated polymer is also associated with chloroform at the start and the said chloroform is also removed as an azeotrope with the added alcohol during the fractional distillation.

4. A process according to claim 1, wherein the said alcohol is added in amount sufficient to produce a suspension in the alcohol of 20%–50% by weight of the polymer when the fractional distillation is completed.

5. A process according to claim 1, wherein a suspension of polyvinyl chloride together with associated carbon tetrachloride in methanol containing about 20% by weight of the polymer is submitted to fractional distillation.

References Cited

UNITED STATES PATENTS

| 1,982,765 | 12/1934 | Schonburg | 260—92.8 |
| 2,920,064 | 1/1960 | Baptist et al. | 260—94.9 |

OTHER REFERENCES

Horsley, L. H. Azeotropic Data, American Chemical Society, Washington, D.C., 1952, p. 15, QD 518 D6.

JOSEPH L. SCHOFER, *Primary Examiner.*

J. A. DONAHUE, *Assistant Examiner.*